Figure 1:
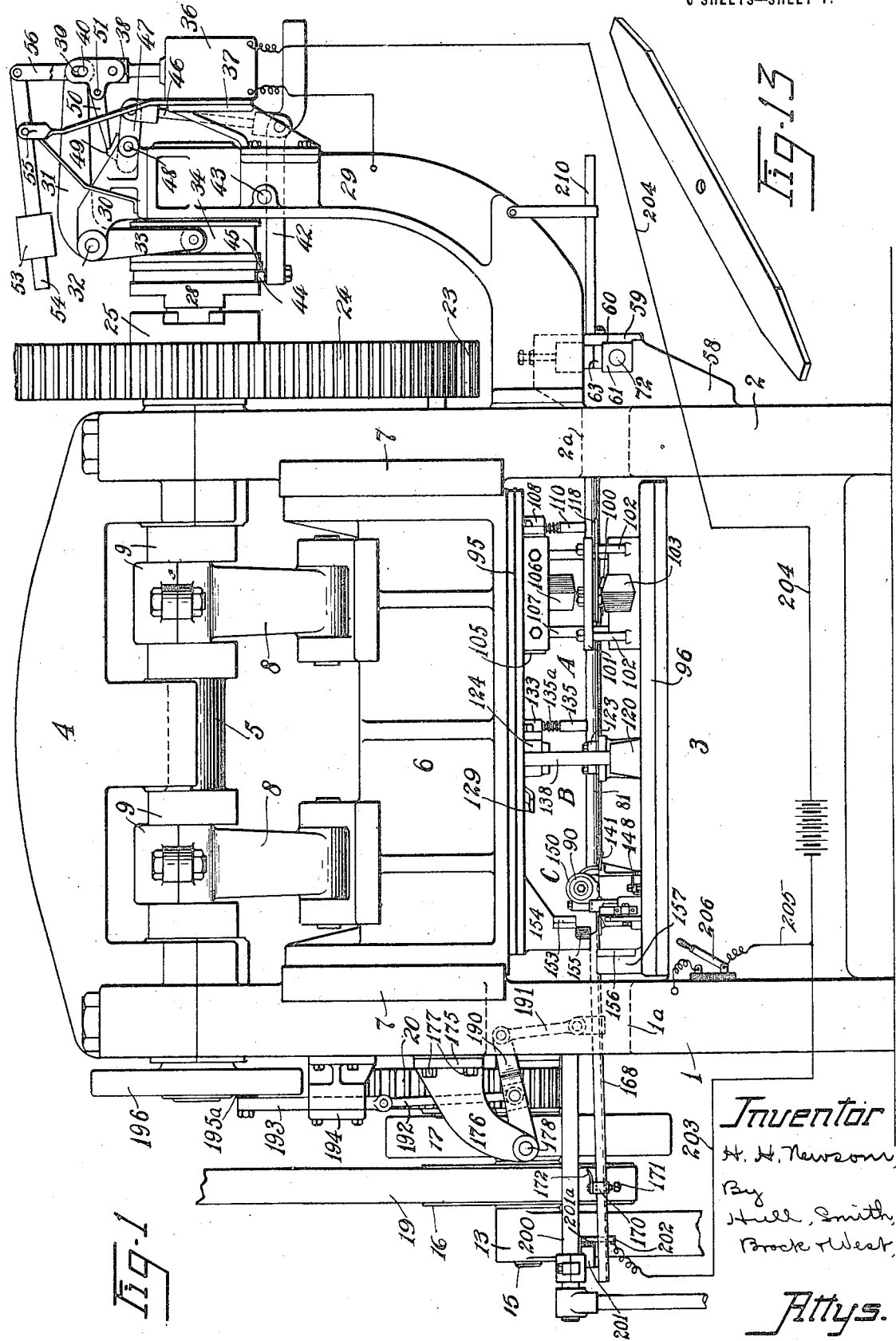

H. H. NEWSOM.
PUNCH AND SHEAR PRESS.
APPLICATION FILED DEC. 20, 1916.

1,289,522.

Patented Dec. 31, 1918.
6 SHEETS—SHEET 2.

Inventor
H. H. Newsom
By Hull, Smith, Brock & West
Attys.

H. H. NEWSOM.
PUNCH AND SHEAR PRESS.
APPLICATION FILED DEC. 20, 1916.

1,289,522.

Patented Dec. 31, 1918.
6 SHEETS—SHEET 3.

Inventor
H. H. Newsom,
By Hull, Smith, Brock & West
Attys.

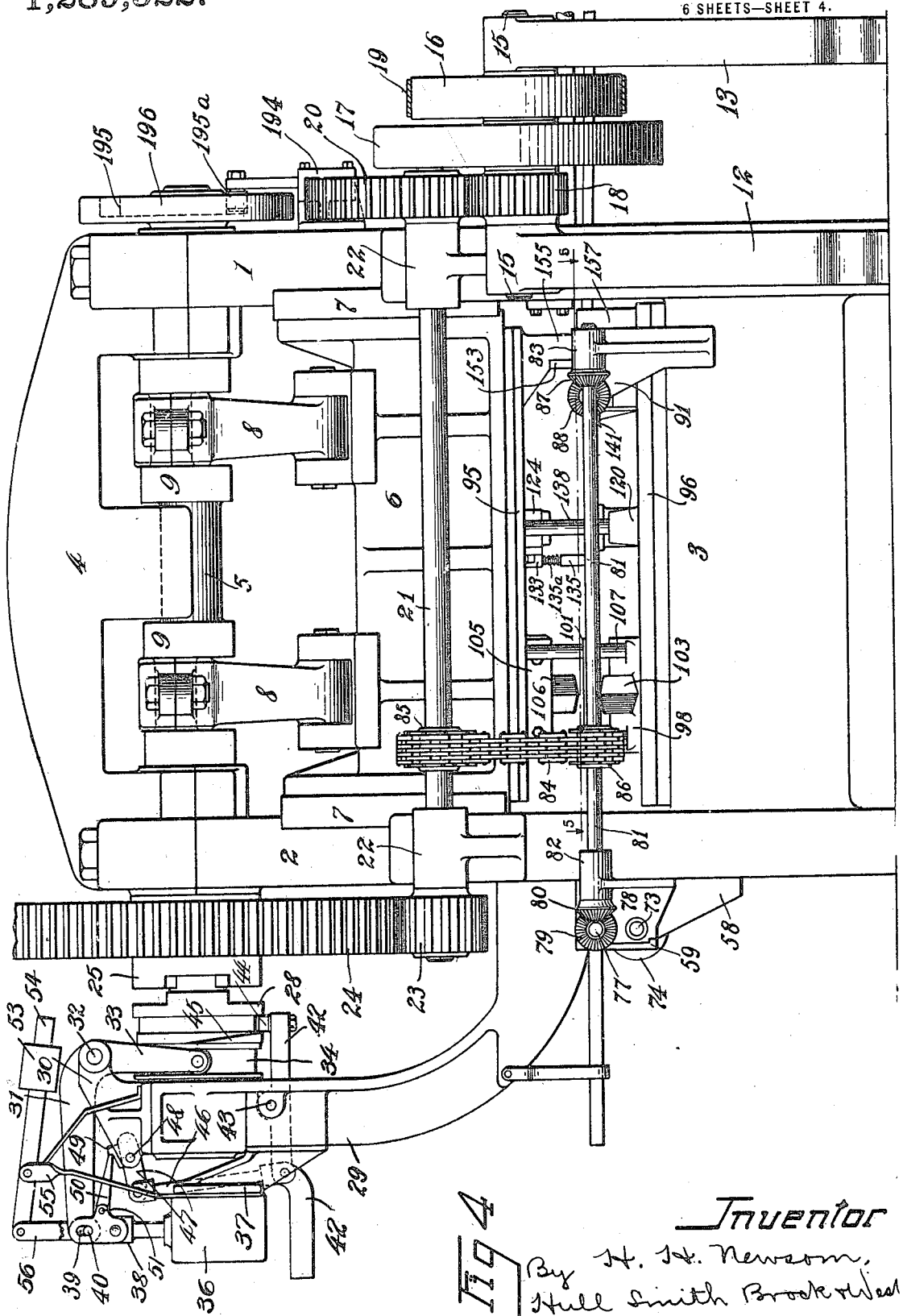

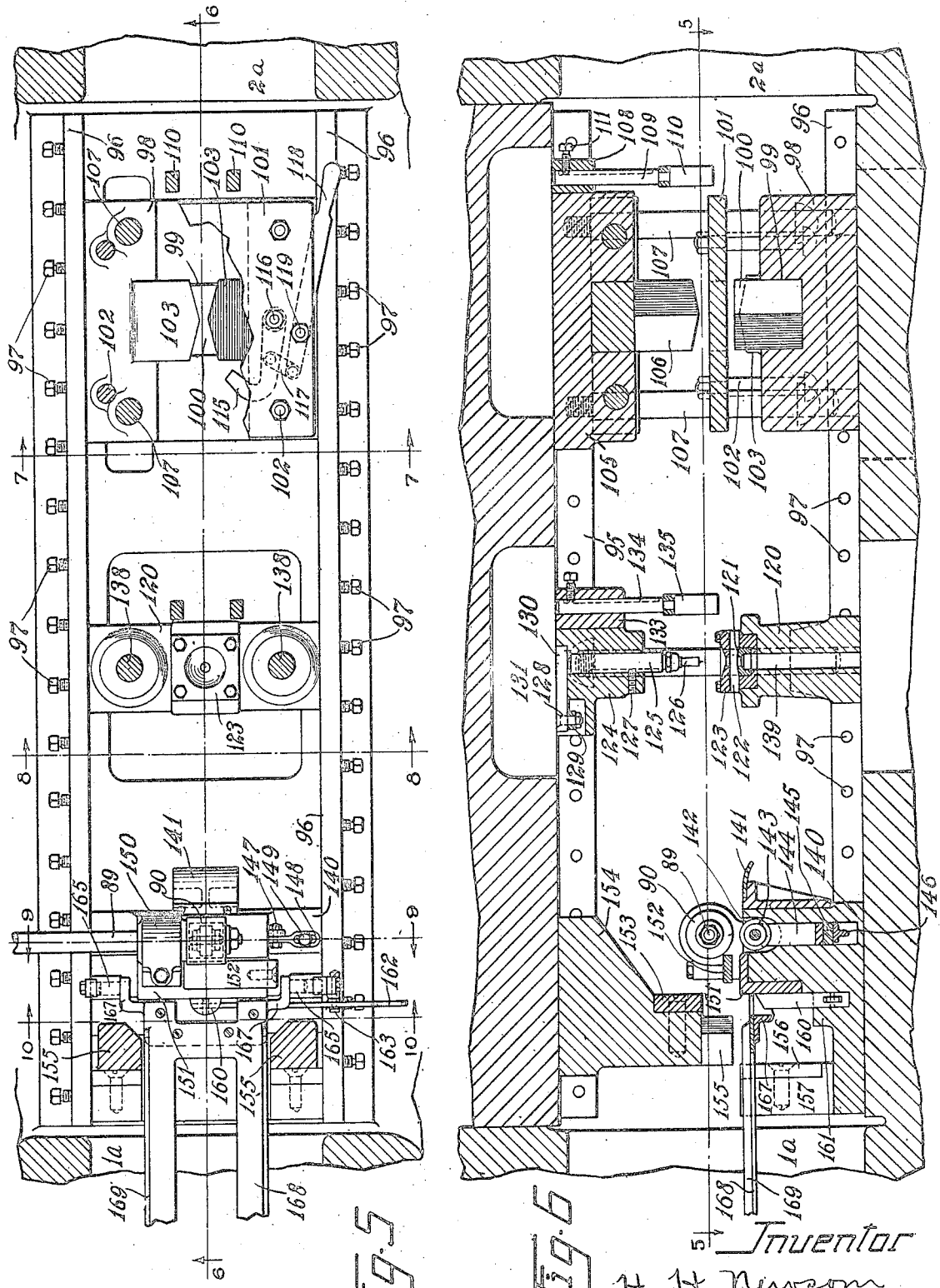

H. H. NEWSOM.
PUNCH AND SHEAR PRESS.
APPLICATION FILED DEC. 20, 1916.

1,289,522.   Patented Dec. 31, 1918.
6 SHEETS—SHEET 6.

Inventor
H. H. Newsom
By Hull, Smith, Brock & West
Attys

UNITED STATES PATENT OFFICE.

HORACE H. NEWSOM, OF CLEVELAND, OHIO, ASSIGNOR, BY MESNE ASSIGNMENTS, TO THE STANDARD PARTS COMPANY, OF CLEVELAND, OHIO, A CORPORATION OF OHIO.

PUNCH AND SHEAR PRESS.

1,289,522.  Specification of Letters Patent.  Patented Dec. 31, 1918.

Application filed December 20, 1916. Serial No. 137,931.

*To all whom it may concern:*

Be it known that I, HORACE H. NEWSOM, a citizen of the United States, residing at Cleveland, in the county of Cuyahoga and State of Ohio, have invented a certain new and useful Improvement in Punch and Shear Presses, of which the following is a full, clear, and exact description, reference being had to the accompanying drawings.

This invention relates to improvements in that class of machines known as punch and shear presses and has reference to certain novel mechanisms for incorporation in machines of this character. It has to do with a series of simultaneously acting sets of dies whereby various operations are performed in succession upon material passing through the machine; and it has further reference to electrically actuated clutch mechanism that is under the direct control of the material passing through the machine whereby the machine is caused to operate automatically as long as it is supplied with material.

The present embodiment of my invention is designed especially for the production of leaves of vehicle springs, and as such I shall proceed to describe it, although it will be understood that by so doing I do not limit the machine to such use alone.

The objects of the invention are the production of an automatic combined punch and shear press through which material is intermittently fed and acted upon successively by a series of simultaneously acting sets of dies, one set imparting the proper form or outline to the product, another acting to punch the product if desired, and the third acting, if required, to shear the product from the body or strip of material; the production of a machine of the aforesaid character involving a stop which determines one (or the linear) dimension of the product and which constitutes an electrical contact, the product forming a circuit closure between such stop or contact and a second element that is in an electric circuit embracing said stop and the clutch actuating mechanism of the machine (in the present instance, the said second element being the frame of the machine); to associate with certain ones of the aforesaid series of die sets manually actuated stops whereby the material may be arrested as it is fed through the machine in proper relation to the respective sets of dies and independent of the stop which is effective automatically; to provide means for rendering one of the aforesaid sets of dies inoperative at will; to provide an adjustment between the sets of dies and between the last set of the series and the stop which is effective in the automatic operation of the machine, whereby products or objects of different lengths may be produced by the same machine; to provide constantly acting feeding mechanism that is effective only when the material is released by the stops and including an adjustment for varying the pressure of the feeding elements upon the material; and to provide a positively acting and efficient mechanism for engaging and disengaging the clutch.

Figure 2:
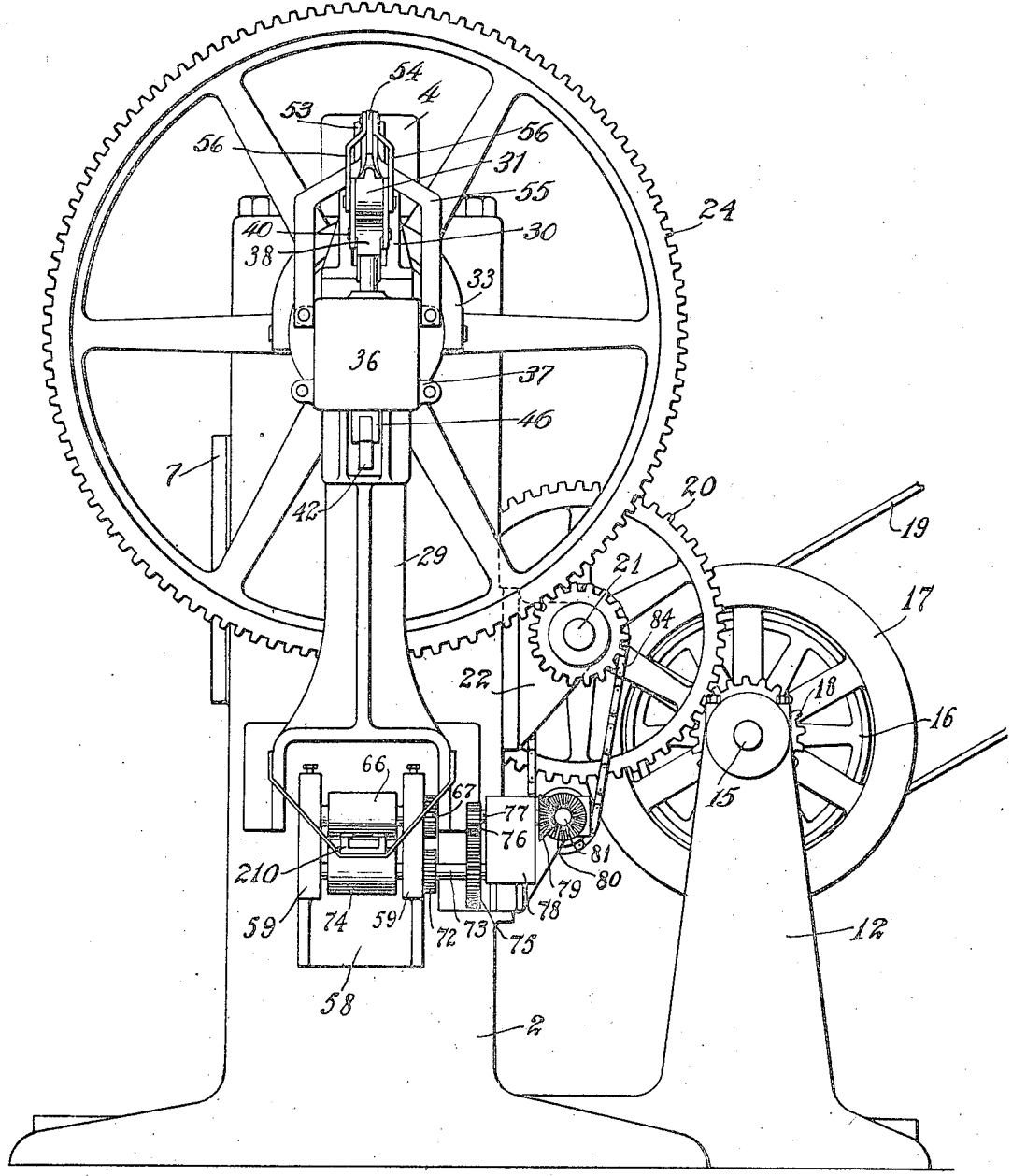
Figure 3:
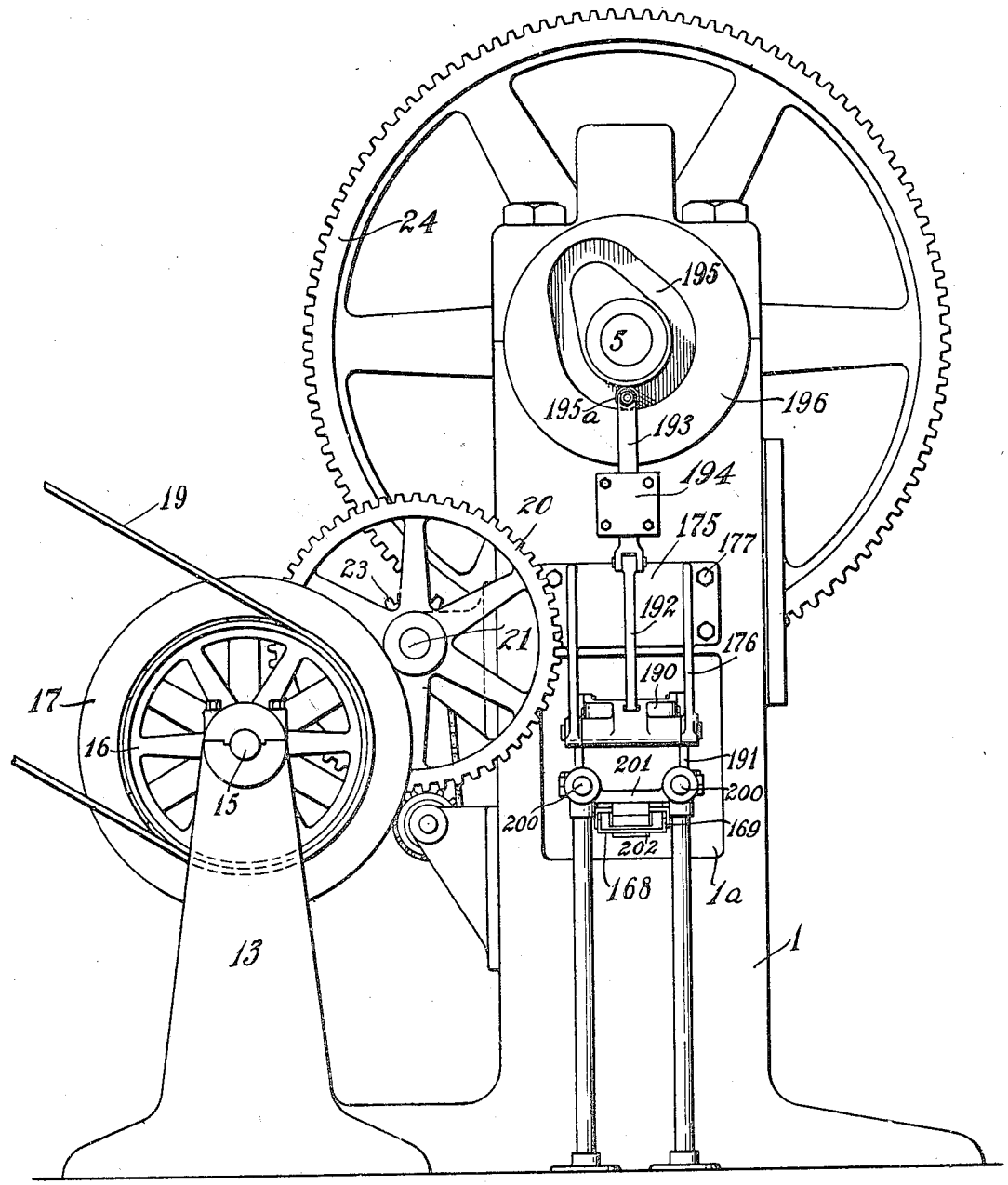
Figure 7:
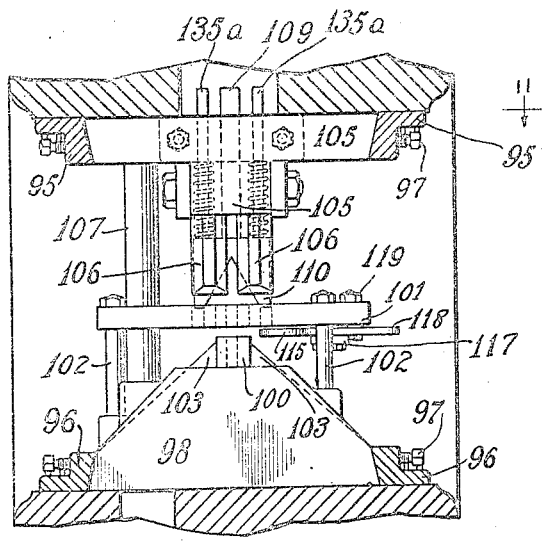
Figure 8:
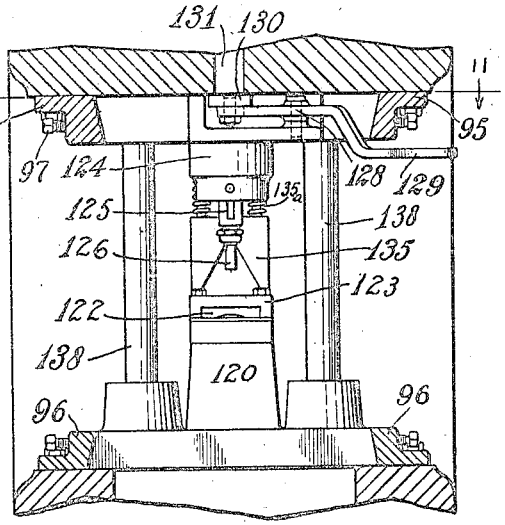
Figure 9:
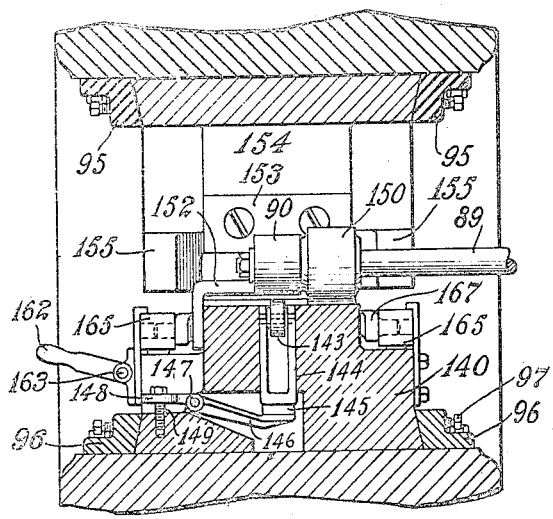
Figure 10:
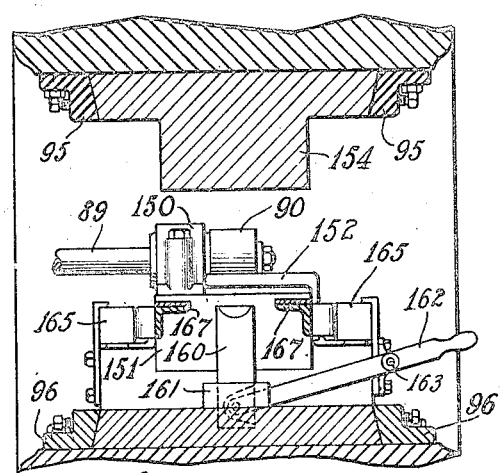
Figure 11:
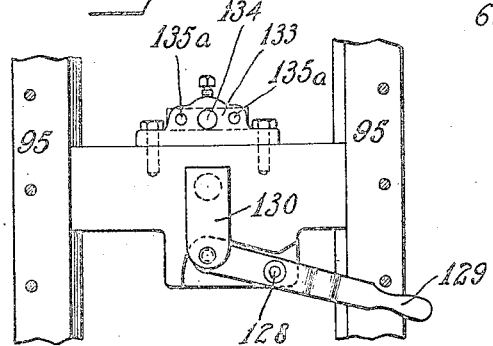
Figure 12:
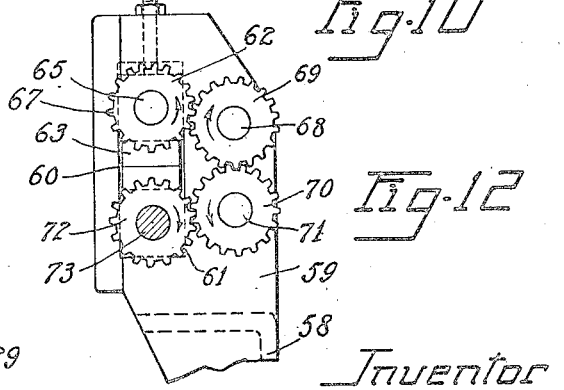

The foregoing and other objects which will become apparent as this description proceeds are attained in the machine illustrated in the accompanying drawings forming a part hereof and wherein Figure 1 is a front elevation of a combined punch and shear press embodying my invention; Fig. 2 is a right hand end elevation; Fig. 3 a left hand end elevation; and Fig. 4, a rear elevation of the press; Fig. 5 is an enlarged fragmentary horizontal section through the press directly above the lower dies of the series, the plane of section being suggested by the lines 5—5 of Figs. 1, 4 and 6; Fig. 6 is a vertical central section through the die sets of the machine, the same including a portion of the head and table of the press, the line of section being indicated by the line 6—6 of Fig. 5; Fig. 7 is a section on the line 7—7 of Fig. 5 and shows the trimming dies in elevation; Fig. 8 is a section on the line 8—8 of Fig. 5 and shows an elevation of the punching dies; Fig. 9, a sectional detail on the line 9—9 of Fig. 5; Fig. 10, a transverse section adjacent the shearing dies, as indicated by the correspondingly numbered section line of Fig. 5; Fig. 11 is a horizontal section on the line 11—11 of Fig. 8; Fig. 12 is a detail of the gearing through which one of the feed rolls is driven from the other; and Fig. 13 is a perspective view of a spring leaf produced by my machine.

The general structure of the press wherein I have shown my invention embodied follows closely the usual construction of presses of this character and comprises left and right hand end housings 1 and 2, respectively, between the lower portions of which is supported the table 3. The upper ends of the housings are connected by a substantial beam 4, and journaled within suitable bearings that are divided between and formed in the beam and housings is the crank shaft 5. The head 6 of the press is reciprocable within ways 7 of the housings, and is operated by connecting rods 8, from the cranks 9 of the shaft 5.

Supported within standards 12 and 13 which are located to the rear of the left hand end of the machine is a shaft 15 having secured to it a pulley 16, and flywheel 17 and a pinion 18. The shaft 15 is driven from any suitable source of power through a belt 19 which passes about the pulley 16. The pinion 18 meshes with a gear 20 secured to the end of a shaft 21 supported by brackets 22 from the rear of the housings 1 and 2. At the opposite or right hand end of the shaft 21 is a pinion 23 which meshes with and drives a gear 24 loosely mounted upon the crank shaft 5 adjacent the housing 2, and one end of the hub of this gear is notched radially to produce a clutch element 25. The other clutch element, which is shown at 28, is slidable upon the shaft 5 between the gear 24 and a bracket 29 that is secured to and extends outward and upward from the housing 2, the extreme right hand end of the crank shaft being journaled within the head of this bracket. The head of the bracket is provided with an extension 30 which projects upward and over the clutch element 28, the extension comprising two side plates between which the angle of a bell crank lever 31 is journaled upon a pin 32 that is supported by the extension. One arm of the bell crank lever is bifurcated to form a fork 33 which embraces the clutch element 28, the ends of the forks being provided with anti-friction rollers which ride within the groove 34 of the clutch element, in accordance with the usual construction of devices of this character. It will be readily seen that when the rear end of the bell crank lever is drawn downward, the clutch element 28 is moved by the action thereof into engagement with the clutch element 25. The bell crank is adapted to be rocked in the manner just described by a solenoid 36 that is supported by a member 37 from the bracket 29, and the core of the solenoid has a head 38 that is forked at its upper end (see Fig. 2) to receive between its branches the end of the horizontal arm of the bell crank lever. It will be observed that the branches of the head 38 are provided with slots 39 within which project the ends of a pin 40 that is carried by the bell crank lever. A lost motion connection is thus provided between head and bell crank which allows the core of the solenoid to move somewhat in advance of the bell crank or before any movement of the bell crank is effected. Extending through a slot in the bracket 29 and horizontal beneath the clutch element 28 is a lever 42 that is pivoted upon a pin 43 supported by the bracket. The lever carries a roller 44 beneath the element 28 that is adapted to be engaged by the side of a cam 45 that is secured to the clutch element. The normal position of the lever 42 is with its end carrying the roller 44 elevated so that said roller is in the plane of the cam 45. Near its opposite end the lever 42 is connected by a link 46 to a rocker arm 47 pivoted upon a pin 48 supported by and between the plates of the extension 30. The end of the rocker arm opposite its connection with the link 46 is provided with a lug 49 for engagement by a pawl 50 that is pivoted at 51 to the head 38 of the solenoid core. When the parts are in normal position, as shown in the drawings, the pawl 50 is in engagement with the lug 49 and extends upward away from the same, and the head 38 is elevated so that the ends of the pin 40 repose within the lower ends of the slots 39.

In the operation of the clutch actuating mechanism, current is supplied to the solenoid 36 (in a manner to be hereinafter explained) thereby energizing the solenoid and causing it to suck inward its core to draw downward the head 38. The initial movement of the head straightens out into a horizontal position the pawl 50 thus swinging the rocker arm 47 upon its pivot to elevate the link 46 and, through it, the outer end of the lever 42. This results in a depression of the opposite end of the lever and a removal of the roller 44 from the cam 45. By this time, the upper ends of the slots 39 have engaged the pin 40, and further descent of the head 38 swings the bell crank lever 31 in a direction to move the clutch element 28 into engagement with the element 25, this action being permitted by reason of the withdrawal of the roller 44 from the cam 45, just as explained. It will be understood that the clutch element 28 is splined to the crank shaft 5 in accordance with common practice so that the shaft is now rotated with the gear 24. Immediately after this operation has been performed, the solenoid is deënergized and its core, with the head 38, is elevated by a weight 53 on a lever 54 fulcrumed upon a pin supported by a bracket 55 which rises above the bracket 29 and is supported from the extension 30 and member 37, the end of the lever 54 opposite the weight 53 being connected by links 56 to the head 38 of the solenoid core. The weight 53 is sufficient only to elevate the head and core to an extent permitted by the length of the slots 39, such being sufficient to return the pawl 50 to its inclined position and allow the rocker arm 47 to drop link 46 and the outer end of the lever 42 to elevate the roller 44 thereof into the path of the cam 45. Consequently as the clutch element 28 rotates the cam 45 will ride along the roller 44 causing the roller to withdraw the clutch element 28 from engagement with the element 25.

The end housings 1 and 2 are provided with openings 1a and 2a, respectively, in the plane of the dies through which material or stock is adapted to be fed by mechanism which will now be described. Secured to the housing 2, beneath its opening 2a, is the base plate 58 of a member having side plates 59 that are provided with slots 60 (Fig. 12) within the lower ends of which repose journal blocks 61, and within the upper ends of which are guided similar blocks 62 that are spaced from the lower blocks by cushions 63 of suitable material, such as rubber, the upper blocks being adapted to be moved toward the lower blocks and against the opposition of the cushions 63 by screws 64 that are threaded through the upper ends of the side plates and bear upon the upper blocks 62. A shaft 65 is journaled within the upper blocks 62 and carries a roller 66, and beyond the rear plate 59 the shaft is provided with a gear 67. Journaled upon a stud 68, that projects from the plate 59, is a gear 69 that meshes with another gear 70, journaled upon a stud 71. This gear 71 meshes with a gear 72 that is fixed upon a shaft 73 journaled within the lower blocks 61. The shaft 73 carries a feed roller 74 between the side plates 59 and in operative relation to the feed roller 66. This arrangement of gearing permits the relative movement between the rollers 66 and 74 accomplished by the screws 64. The shaft 73 extends rearwardly beyond the gear 72 and has attached to it a gear 75 which meshes with a gear 76 secured to a shaft 77, journaled within a bracket 78, the shaft 77 having attached to its opposite end a miter gear 79 that meshes with a similar gear 80, secured to the end of a shaft 81, supported by brackets 82 and 83, the former, for convenience, being cast integral with the bracket 78 and the latter supported from the rear of the table 3 of the press. The shaft 81 is driven from the shaft 21 by what is commonly known as a "noiseless chain" 84, that passes about the gears 85 and 86, secured to the respective shafts 21 and 81. Adjacent the bracket 83, the shaft 81 has secured to it a miter gear 87 which meshes with a similar gear 88 secured to a shaft 89 that extends transversely of the machine and carries a feed roller 90, the shaft 89 being journaled at one end within an extension 91 of the bracket 83. The elements coöperating with the roller 90 to constitute what I will term the auxiliary feeding mechanism will be described in connection with the shearing dies adjacent to which they are located.

The head 6 and table 3 of the press are provided, respectively, with pairs of side rails 95 and 96, the opposed faces of which diverge inward to form, in effect, a dove tail channel for the retention of die supporting blocks, as will hereinafter be explained. The rails are provided with set screws 97, whereby the blocks may be held in place.

Adjacent the right hand end of the machine is located what I have already referred to as the trimming dies. A block 98, having a dove tail formation at its base which is embraced by the rails 96, is provided at its center with a socket 99 within which is fitted the lower end of one of the trimming dies, the same being designated 100. A stripper plate 101 is supported a suitable distance above the upper surface of the die 100 by studs 102. The die 100 is reinforced on each side by substantial ribs 103 that are formed integral with the block 98. A block 105, having its upper portion formed similarly to the lower portion of the block 98, is clamped between the opposed rails 95 of the head of the press. Fitted within a socket formed in the central portion of the block 105 is the upper end of the die 106, said die being formed with two legs which descend, when the head of the press is lowered, through appropriately shaped openings in the stripper plate 101 and straddle the die 100. In order to maintain accurate relation between the die members, posts 107, which have their upper ends screwed into the block 105, extend downward through openings in the stripper plate and into bores in the block 98, in which bores the lower ends of the posts reciprocate during the action of the press.

Connected to the right hand end of the block 105 is a bracket 108 having a bore within which is guided the shank 109 of a centering device 110, such device consisting of a block having a V-shaped notch that is adapted to embrace the stock or material as it is fed to the trimming dies between the lower die member and the stripper plate 101. The shank 109 of the centering device is grooved longitudinally to within a short distance of its upper end for the reception of the end of a set screw 111, whereby the device is held against withdrawal from the bore of the bracket 108. This centering device is identical with a centering device associated with the punching dies, later to be described. A full description will be made of the guiding means in connection with the latter centering device. A hook shaped stop 115 is pivoted upon a bolt 116 that is carried by the stripper plate, and at about its center, the stop has connection through link 117 with the end of a lever 118 that is fulcrumed upon a bolt 119, also carried by the stripper plate. It will be explained that, when the handle end of the lever 118 is swung outward, it will rock the stop 115 until the nose thereof swings across the upper surface of the die 100 and is caused, by the proportion of the parts, to stop at the center, or at the narrowest part of said die, for a purpose which will become apparent from the description of the operation of the machine.

At about the longitudinal center of the table there is clamped, between the rails 96, a block 120 which carries the female member 121 of the punching dies. Supported a slight distance above such die member, by ribs 122 of the block 120, is a stripper plate 123. Above the block 120, another block 124 is supported between the rails 95 of the head of the press, and this block is provided with a central bore within which is contained a plunger 125 that carries, at its lower end, a punch or die 126. The side of the plunger 125 is grooved for the reception of the end of a set screw 127, the groove being of such length as to allow the plunger to drop sufficiently to present the punch in operative relation to the die member 121. In an offset portion of the block 124 is pivoted, at 128, a lever 129, which has a pin-and-slot connection at its inner end with a gag plate 130 that is slidable in a channel, formed in the upper face of the block, across the upper end of the bore thereof. A cavity 131 is formed in the head 6, so that when the lever 129 is swung in a direction to withdraw the gag plate 130 from its position above the upper end of the plunger 125, the plunger is free to ascend when the punch encounters an obstruction during the descent of the head.

The block 124 has secured to its right hand side a bracket 133 within a bore of which is guided the shank 134 of a centering device 135, similar to the centering device described in connection with the trimming dies. Each of these devices, as will appear more particularly from Figs. 11 and 7, is provided with guide rods 135$^a$ which are adapted to reciprocate within suitable bores within the bracket which supports the device, and springs surround these guide rods and tend to depress the centering device.

Proper relation is maintained between the punch and die member 121 by the substantial posts 138 which are carried by the block 126 and enter and reciprocate within bores in the block 120. The block 120 is provided with a central bore 139 through which slugs may drop from the die, the bore discharging into an opening in the table of the press.

A block 140 is located adjacent the left hand end of the table and is clamped between the rails 96 thereof. The side of the block toward the punch is provided with a guide lip 141, and a slight distance beyond this lip is located, within a cavity 142 of the block, a roller 143 which is carried between the forks of a U-shaped member 144. This member is guided within a suitable passageway in the block and rests upon a cushion 145 (preferably of rubber) which, in turn, is supported by the inner end of an arm 146 located within a cavity into which the aforesaid passageway opens at its lower end. The arm 146 is pivotally supported upon a pin 147 that is carried by the block, and an extension 148 of the arm is provided with an aperture through which is passed a cap screw 149 that is threaded into an adjacent portion of the block. By means of this screw, the arm 146 may be rocked upon its pivot to change the elevation of the roller 143 and to adjust it with respect to the roller 90, previously referred to as carried by the shaft 89, which shaft is supported, at its end adjacent the roller 90, by a bracket 150 that is carried by the block 140. Beyond the roller 143, the block 140 has applied to it a hardened metal angle member which constitutes one of the shearing dies and which is designated 151, a stripper plate 152 being supported a slight distance above it. The other member 153 of the shearing die is secured to a block 154 that is clamped between the side rails 95 of the head 6. To maintain these shearing dies against separation in a horizontal direction, the block 154 is provided with depending extensions 155 which engage and ride along hardened plates 156 that are secured to vertical extensions 157 of the block 140.

For a purpose which will become apparent further along in the description, a stop is associated with the shearing dies and the same consists of a finger 160 which has its lower end guided within a pocket 161 in the block 140 and is adapted to be elevated by means of a lever 162, that is pivoted at 163 to the block and has its inner end suitably connected to the lower end of the finger. As will appear from Fig. 6, when the finger is elevated it rises in the vertical plane of the shearing edges of the die members.

Pivoted within ears 165 that are carried by the block 140 on opposite sides of the shearing dies, are the opposed trunnions of a forked member 167 which has connected to it the inner end of a skeleton frame which I shall refer to as the "kick off" 168, the same extending outward through the opening 1$^a$ of the housing 1, and being provided with side flanges 169. A member 170 is adjustably connected to the "kick off" frame by a set screw 171, and said member is provided with a finger 172. The "kick off" is swung upon its trunnions, between a horizontal and a considerably inclined position, by mechanism which I will now describe.

The base plate 175 of a double bracket 176 is secured, by cap screws 177, to the end housing 1 of the machine immediately above the opening 1ª thereof; and between the outer ends of the double bracket is pivoted, upon a shaft 178, one end of a Y-shaped yoke 190 which has the ends of its fork branches connected, by links 191, to the frame 168. A link 192 connects the central part of the yoke 190 to the lower end of a slide 193 that is guided within a bracket 194, supported by the housing 1 above the double bracket 176. An anti-friction roller 195ª, that is carried by the upper end of the slide 193, projects into a cam groove 195 of a disk 196 that is secured to the left hand end of the crank shaft 5. By reason of the shape of the cam groove, the frame 168 is lowered and elevated once during each rotation of the shaft.

As will appear from Figs. 1 and 3, a pair of spaced guides 200 are supported in parallel relation beyond the left hand end of the machine, and a stop carrier 201 is adapted to be clamped in any adjusted position therealong. The stop carrier extends over the "kick off" frame, and a stop 202 is supported by the carrier in a position to depend through the longitudinal opening of the frame, when the same is in horizontal position. It will be observed that the stop 202 is insulated from the carrier 201 by a block 201ª of insulating material, and from the electrical diagram associated with Fig. 1, it is apparent that the stop 202 is in a circuit represented generally by the lines 203 and 204, said circuit also containing the solenoid 36 and the frame of the machine, the circuit having a branch represented by the wire 205, which is provided with a switch 206, the branch serving, when the switch is closed, to close a circuit including the machine frame, battery and solenoid. With the switch open, the circuit is adapted to be closed by a piece of stock or material extending between the shearing dies and the stop.

I have already described how the machine is driven. It is obvious how the head of the press is reciprocated when the clutch elements are in engagement. We will assume that a piece of metal from which the spring leaves are to be made, and which, I may explain, is supplied in long strips, is fed between the main feed rollers 66 and 74, a guide 210 being provided and supported from the bracket 29 in advance of the feed rollers. The operator upon introducing a piece of material, swings the lever 118 to the left for the purpose of projecting the stop 115 into effective position. The feed rollers carry the material inward until it engages the stop 115, the rollers being adjusted so as to slip upon the material when it is arrested by the stop. The operator then throws the switch 206 to close the circuit to the solenoid 36, thereby energizing the solenoid and engaging the clutch for the purpose of operating the machine. Immediately after the machine starts to operate the attendant may open the switch. Upon the descent of the head 6, the material will be properly positioned with respect to the trimming dies by the centering device 110. The end of the material, terminating central of the dies on account of its being so positioned by the stop 115, will have its corners beveled off by the trimming dies according to the shape of the die displayed in Fig. 5, one leg of the upper die member acting on each side of the strip. The operator then removes the stop 115 by returning the lever 118 to normal position and immediately depresses the lever 162 to elevate the stop finger 160. The strip, now being free to move, is fed by the feed rollers until its forward and trimmed end passes on between the punching dies, is picked up by the auxiliary feed rollers 90 and 143, and comes into engagement with the stop finger 160 and is arrested thereby. The operator again closes the switch 206 to actuate the press. During this operation, two shallow notches will be punched from the sides of the material by the trimming dies, and midway between the notches and the previously trimmed end of the material, the strip will be perforated by the punch 126, the same being properly located transversely with respect to the punch by the centering device 135. The shearing dies will perform no operation at this stage (unless to depress the stop finger 160, if the same had been retained in elevated position by the operator). Upon the ascent of the head of the press, the feed rollers will carry the material on through the machine until its end engages the stop 202. Immediately upon engaging this stop, the circuit to the solenoid 36 is closed by the material bridging the gap between the stop and the frame of the machine as previously explained. Consequently, the press will operate to again trim the opposite edges of the material; to punch the same; and to sever it by the shearing dies at the narrowest point of the previously trimmed portion. Immediately after the shearing dies have performed their operation, the "kick off" frame 168 is caused to rock downward through the mechanism controlled by the cam groove of the disk 195, and the finger 172 of the member 170 positively removes the completed product from between the shearing dies and the stop 202 and throws it downward to be carried away by a suitable conveyer or other means. Successive operations of the machine continue until the strip of material is cut into spring leaves of a length for which the machine is set, and after completing all that can be made from one strip of material, if there remains a piece of sufficient length to serve as a shorter leaf, but long enough to extend between the punching dies while the shearing dies are severing it from the preceding leaf, the operator, by means of the lever 129, removes the gag plate 130 from above the plunger which carries the punch, allowing the plunger to recede within the cavity 131 of the head of the press, thus rendering the punch ineffective and preventing it from disfiguring or spoiling the remaining portion of the strip of material.

I have already referred to the adjustment between the sets of dies whereby spring leaves of different lengths may be produced by the machine. From the foregoing description of the construction of the machine it is evident that the set screws 97 may be loosened and the die members supported by the head and table of the press adjusted longitudinally thereof. For the reason that the shaft 89 which carries the roller 90 of the auxiliary feeding mechanism is permanently located by the bracket 83, it is desirable to leave the shearing dies in a permanent location and to adjust the other dies toward and from them. To adjust the machine for the production of a shorter leaf than that for which it is shown as arranged, the blocks 98 and 105 may be loosened by unscrewing the set screws 97 and the dies moved bodily toward the shearing dies until the distance between the centers of the trimming dies and the line whereon the shearing dies cut the material is equal to the desired length of spring, the posts 107 through which the blocks 98 and 105 are held in relative position facilitating in such an adjustment of the dies. It being desirable to punch the leaf at its longitudinal center, the blocks 120 and 124 which carry the punching dies are adjusted to a position whereby this end may be attained. The final adjustment required to fit the machine for the shorter length spring is the movement of the stop carrier 201 inward along the guides 200 so that it will be spaced from the shearing dies the exact length of the shorter spring. With the machine so adjusted, it may be caused to operate automatically in the manner already set forth.

Having thus described my invention, what I claim is:

1. Feeding mechanism for apparatus of the character set forth, said mechanism comprising a pair of feeding rolls, a carrier for one of said rolls, a pivotally supported arm, a cushion element through which said carrier is supported from the arm, and means for adjusting said arm to vary the relation of the rolls.

2. In apparatus of the character set forth, the combination of punching dies and shearing dies, the former operating to punch a strip of material at a definite point transversely thereof, and the latter to shear the sides of the strip, and a device associated with each of said dies that is moved into engagement with the strip slightly in advance of the operation of the dies for locating the strip laterally in proper position with respect to the dies.

3. In apparatus of the character set forth, the combination of punching dies and shearing dies, the former operating to punch a strip of material at a definite point transversely thereof, and the latter to shear the sides of the strip, and means moved automatically into engagement with the strip and acting to locate the strip laterally in proper relation to said dies.

4. In apparatus of the character set forth, the combination of punching dies and shearing dies, the former operating to punch a strip of material at a definite point transversely thereof, and the latter to shear the sides of the strip, and means operating automatically to locate the material in proper relation to said dies, said means comprising a forked head having diverging branches adapted to straddle the strip of material, the head being provided with a shank, and a guide member, and a bracket in fixed relation to the dies and having a bore and a guideway within which the shank and the guide, respectively, of the head are reciprocable.

5. In apparatus of the character set forth, the combination of a pair of sets of dies, one set having means for acting upon the sides of a strip of material, and the other having means to shear the same in definite relation to the parts acted upon by the former set of dies, and a manually controlled stop associated with each set of dies for locating the strip in proper relation thereto.

6. In apparatus of the character set forth, the combination of a pair of sets of dies, one set acting to treat material passed therethrough, and the other to shear the material in definite relation to the part thus treated, means for feeding material through said dies, a stop for arresting the movement of the material and maintaining it in definite relation to the dies, electrical means controlling the operation of the dies, an electric circuit involving said means and the aforesaid stop, the engagement of the material with the stop acting to close said electric circuit and effect an operation of the dies, manually controlled stops for arresting the movement of the material and for maintaining it in proper relation to each set of dies, and a switch for closing the aforesaid electric circuit when the manually controlled stops are employed.

7. Feeding mechanism for apparatus of the character set forth, said mechanism comprising a pair of feeding rolls, a carrier for one of said rolls, a guide within which said carrier is movable toward and from the other roll, a pivotally supported arm, a cushion element interposed between the free end of said arm and the carrier, and means for adjusting said arm to vary the relation of the rolls.

8. Feeding mechanism for apparatus of the character set forth, said mechanism comprising a pair of feeding rolls, an arm pivotally supported intermediate its ends and by one end of which one of said rolls is supported, and an adjusting screw coöperating with the opposite end of the arm and through which its position may be varied to alter the relation of the rolls.

9. The combination of a set of dies designed to act upon a piece of material in the shaping of adjacent parts of adjoining blanks, and a stop movable into and out of effective position for engaging the end of the piece and locating it in position to be shaped as the part of a single blank.

10. The combination of a set of dies designed to trim opposite edges of a strip of material in the shaping of adjacent ends of adjoining blanks, and a stop movable into a position between the dies for engaging the end of a strip and locating it in position to be trimmed as the end of a single blank.

11. In apparatus of the character set forth, the combination of cutting means through which a piece of material is adapted to be fed; electrical means for controlling the operation of said cutting means; a stop against which the material engages as it passes beyond the cutting means but prior to being acted upon thereby, the stop and cutting means being insulated from each other; and an electrical circuit including a source of power, said stop, the aforesaid electrical means, and the cutting means, all of said elements and the material constituting electrical conductors, wherefore the engagement of the material with said stop will cause an operation of the cutting means.

12. In apparatus of the character set forth, the combination of cutting means; mechanism for automatically feeding material through said means; electrical means for controlling the operation of the cutting means; a stop against which the material engages as it passes beyond the cutting means but prior to being acted upon thereby, the stop and cutting means being insulated from each other; and an electric circuit including a source of power, said stop, the aforesaid electrical means and the cutting means, all of said elements and the material constituting electrical conductors wherefore the engagement of said material with said stop will cause an operation of the cutting means.

13. In apparatus of the character set forth, the combination of cutting means, electrical means for controlling the actuation of the cutting means, a stop wherewith material is adapted to engage when it passes beyond the cutting means and prior to being acted upon thereby, the stop and cutting means being insulated from each other, an electric circuit including a source of power, the aforesaid stop, the electrical means, and the cutting means, all of said elements and the material constituting electrical conductors, and means operated in synchronism with the cutting means for moving the material from engagement with the stop.

14. In apparatus of the character set forth, the combination of cutting means, means for automatically feeding material through said cutting means, a stop wherewith the material engages when it passes beyond the cutting means and prior to being acted upon thereby, the stop and cutting means being insulated from each other, electrical means for actuating the cutting means, an electric circuit including a source of power, said stop, the electrical means, and the cutting means, all of said elements and the material constituting electrical conductors, and means operated in synchronism with the cutting means for removing the material from engagement with the stop.

15. Feeding mechanism for apparatus of the character set forth, said mechanism comprising a pair of feeding rolls, an arm pivotally supported intermediate its ends and by one end of which one of said rolls is supported, an adjusting screw coöperating with the opposite end of the arm and through which its position may be varied to alter the relation of the rolls, and a cushion element interposed between the aforesaid arm and the roll supported thereby.

In testimony whereof I hereunto affix my signature.

HORACE H. NEWSOM.

Witnesses:
R. A. FLUM,
M. W. WIR__MER.